United States Patent [19]

Tazaki

[11] Patent Number: 4,580,150

[45] Date of Patent: Apr. 1, 1986

[54] RECORDING APPARATUS

[75] Inventor: Shigemitsu Tazaki, Matsudo, Japan

[73] Assignee: Canon Kabushiki Kaisha, Tokyo, Japan

[21] Appl. No.: 631,515

[22] Filed: Jul. 17, 1984

Related U.S. Application Data

[63] Continuation of Ser. No. 463,824, Feb. 4, 1983, abandoned.

[30] Foreign Application Priority Data

Feb. 12, 1982 [JP] Japan ................................ 57-19557

[51] Int. Cl.[4] ............................................ G01D 15/18

[52] U.S. Cl. ................................ 346/140 R; 400/126

[58] Field of Search ............... 346/140 R, 75; 358/75; 400/126

[56] References Cited

U.S. PATENT DOCUMENTS

| | | | |
|---|---|---|---|
| 2,590,200 | 3/1952 | Neidich | 400/240.4 |
| 3,056,384 | 10/1962 | Beale et al. | |
| 3,121,138 | 2/1964 | Murphy | |
| 3,386,102 | 5/1968 | Scheuzger et al. | |
| 3,482,258 | 12/1969 | Steen | |
| 3,864,696 | 2/1975 | Fischbeck | 346/140 |
| 4,121,222 | 10/1978 | Diebold et al. | |
| 4,183,031 | 1/1980 | Kyser et al. | |
| 4,291,317 | 9/1981 | Corwin et al. | |
| 4,313,684 | 2/1982 | Tazaki | 346/140 X |
| 4,329,698 | 5/1982 | Smith | 346/140 |
| 4,367,482 | 1/1983 | Heinzl | 346/140 |
| 4,380,771 | 4/1983 | Takatori | 346/140 |
| 4,383,263 | 5/1983 | Ozawa et al. | |
| 4,437,104 | 3/1984 | Hudson | 346/140 |
| 4,447,820 | 5/1984 | Terasawa | 346/140 |
| 4,463,359 | 7/1984 | Ayata | 346/140 X |

FOREIGN PATENT DOCUMENTS

| | | |
|---|---|---|
| 2709730 | 10/1977 | Fed. Rep. of Germany . |
| 2812562 | 4/1978 | Fed. Rep. of Germany . |
| 5449696 | 3/1977 | Japan . |

*Primary Examiner*—Joseph W. Hartary
*Attorney, Agent, or Firm*—Fitzpatrick, Cella, Harper & Scinto

[57] ABSTRACT

Disclosed is a recording apparatus wherein a record head having a plurality of ink jet nozzles is mounted on a carriage which scans a print plane. The number of ink jet nozzles of a first color ink used to record primary characters or patterns is larger than the number of ink jet nozzles of a second color ink used to record non-primary characters or patterns, and the print speed for the primary characters or patterns is higher than the print speed for the non-primary characters or patterns.

9 Claims, 17 Drawing Figures

FIG. 4-C
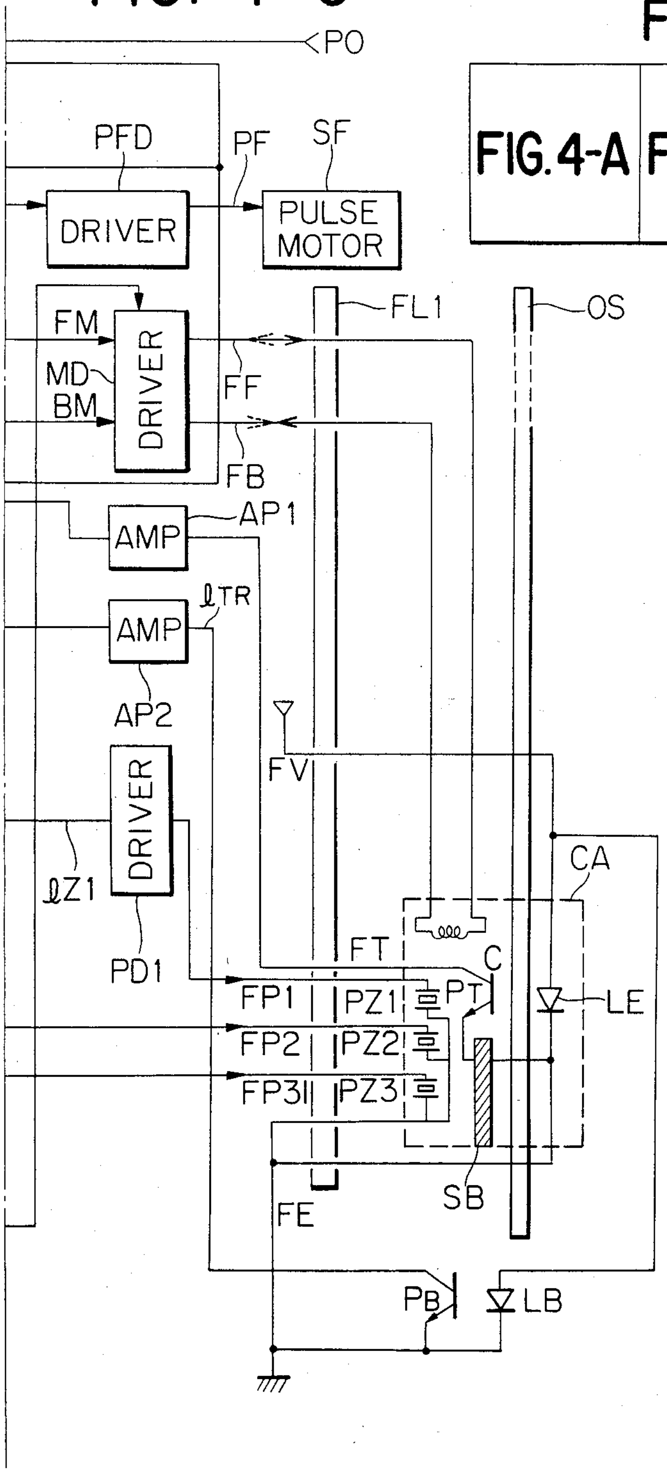
FIG. 4
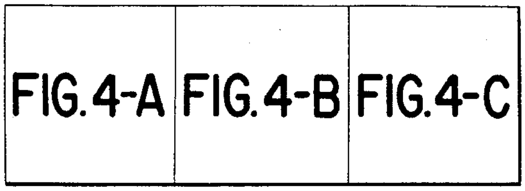

FIG. 4-A
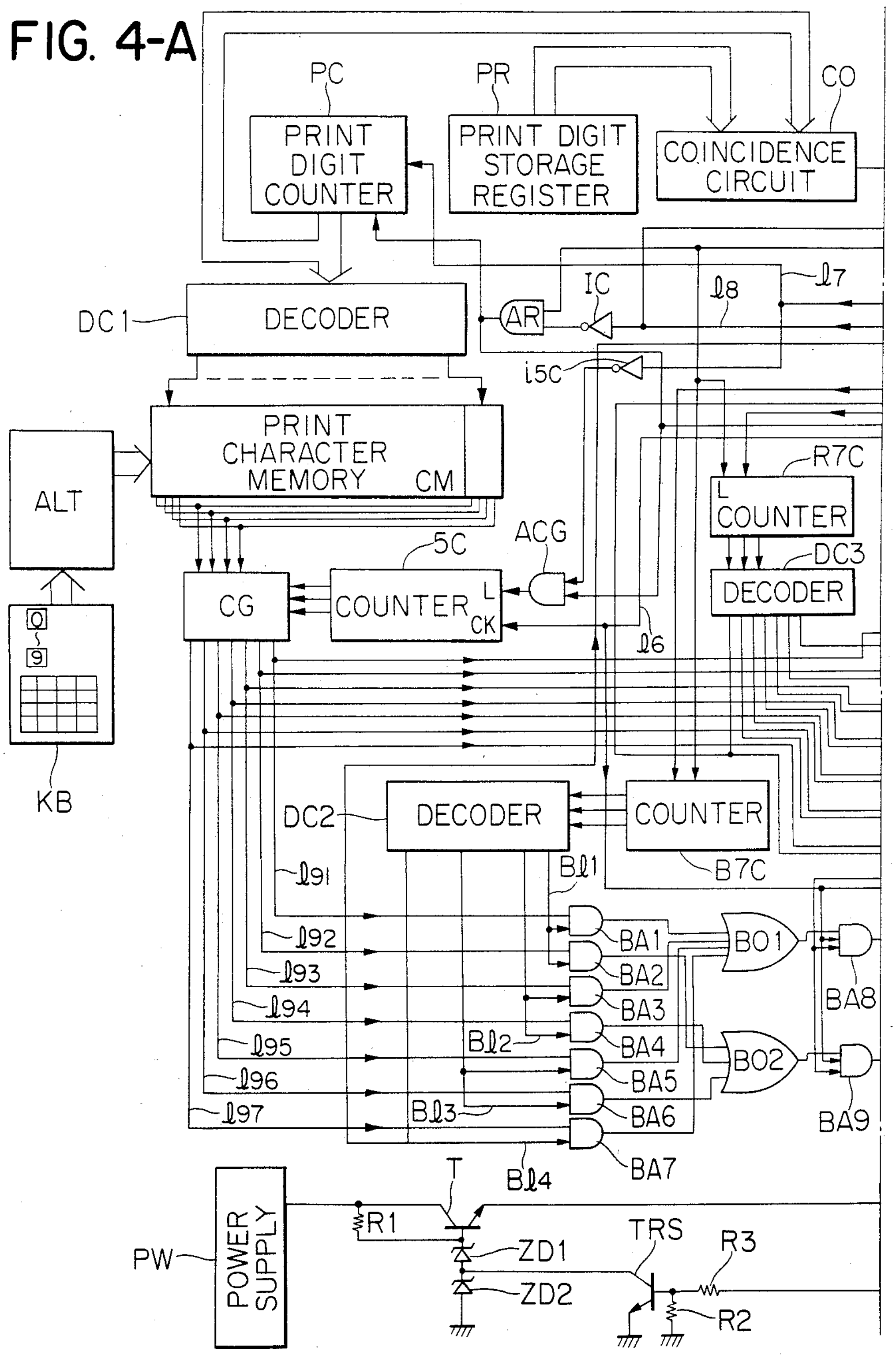

FIG. 4-B
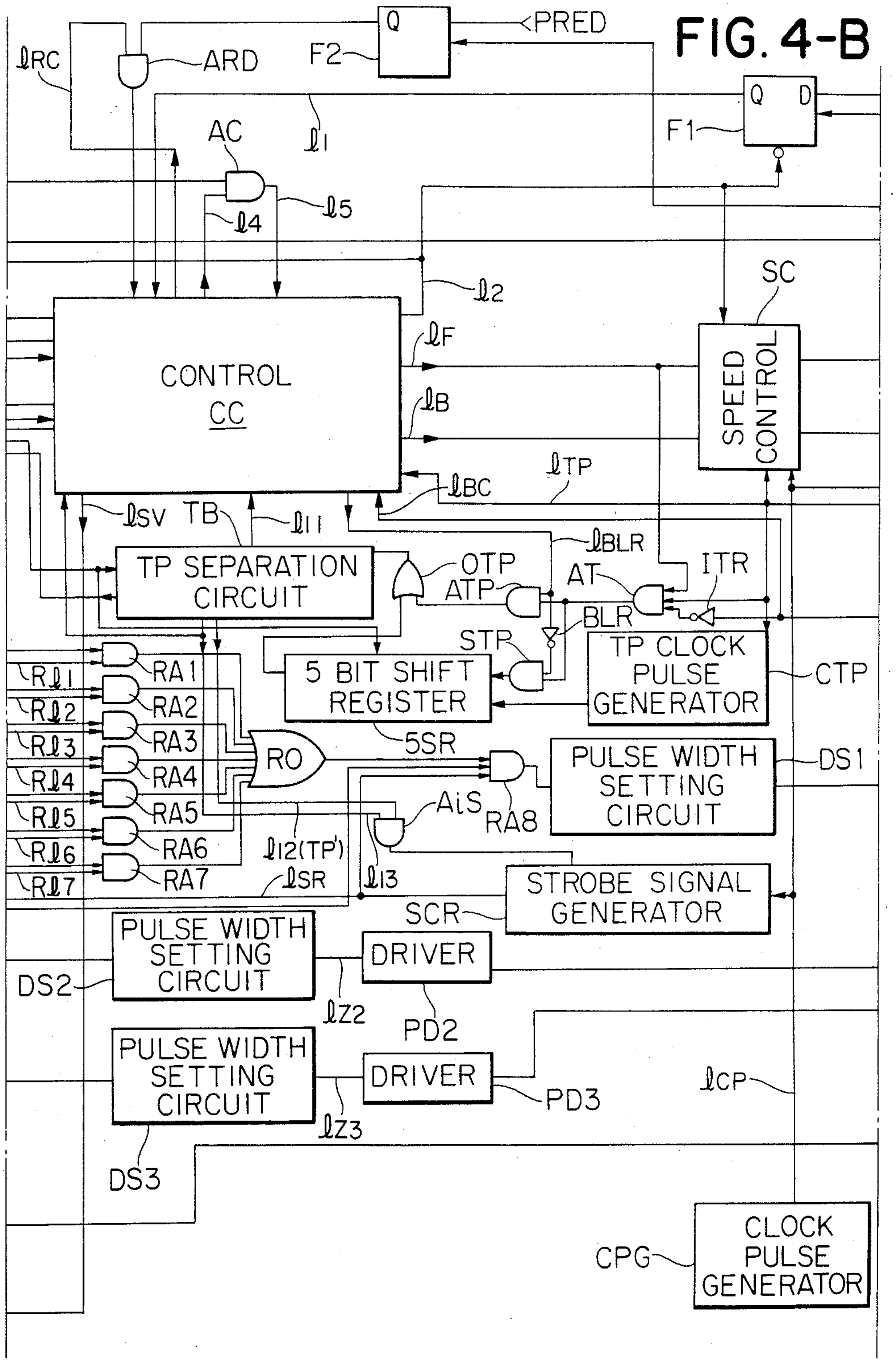

RECORDING APPARATUS

This application is a continuation of application Ser. No. 463,824 filed Feb. 4, 1983, now abandoned.

BACKGROUND OF THE INVENTION

Field of the Invention

The present invention relates to a recording apparatus for sequentially recording by scanning a record sheet, and more particularly to a recording apparatus which simplifies the structure and a record operation of a recording head which records by inks of different colors.

BRIEF DESCRIPTION OF THE DRAWINGS

FIG. 4 composed of FIGS. 4-A, 4-B and 4-C, shows a block diagram of a carriage drive control circuit in the embodiment of FIGS. 1 and 2.

DESCRIPTION OF THE PREFERRED EMBODIMENTS

Figure 1:
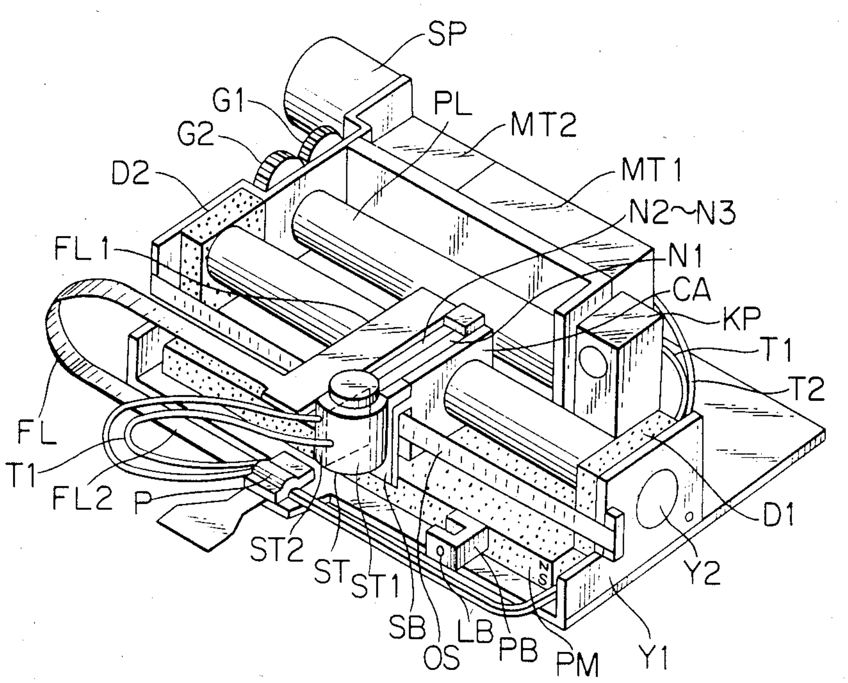
FIG. 1 shows a perspective view of one embodiment of a recording apparatus of the present invention.
Figure 2:
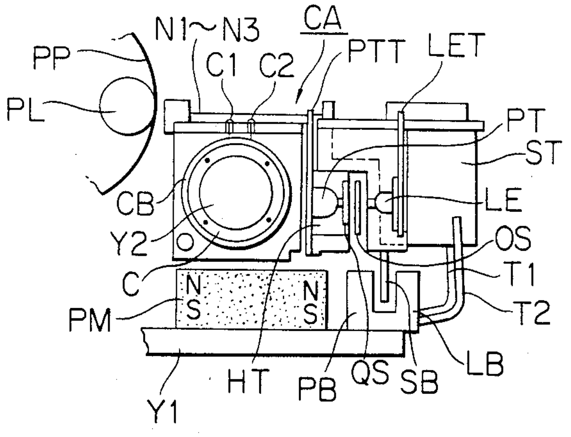
FIG. 2 shows a side elevational view thereof.
Figures 3A, 3B:
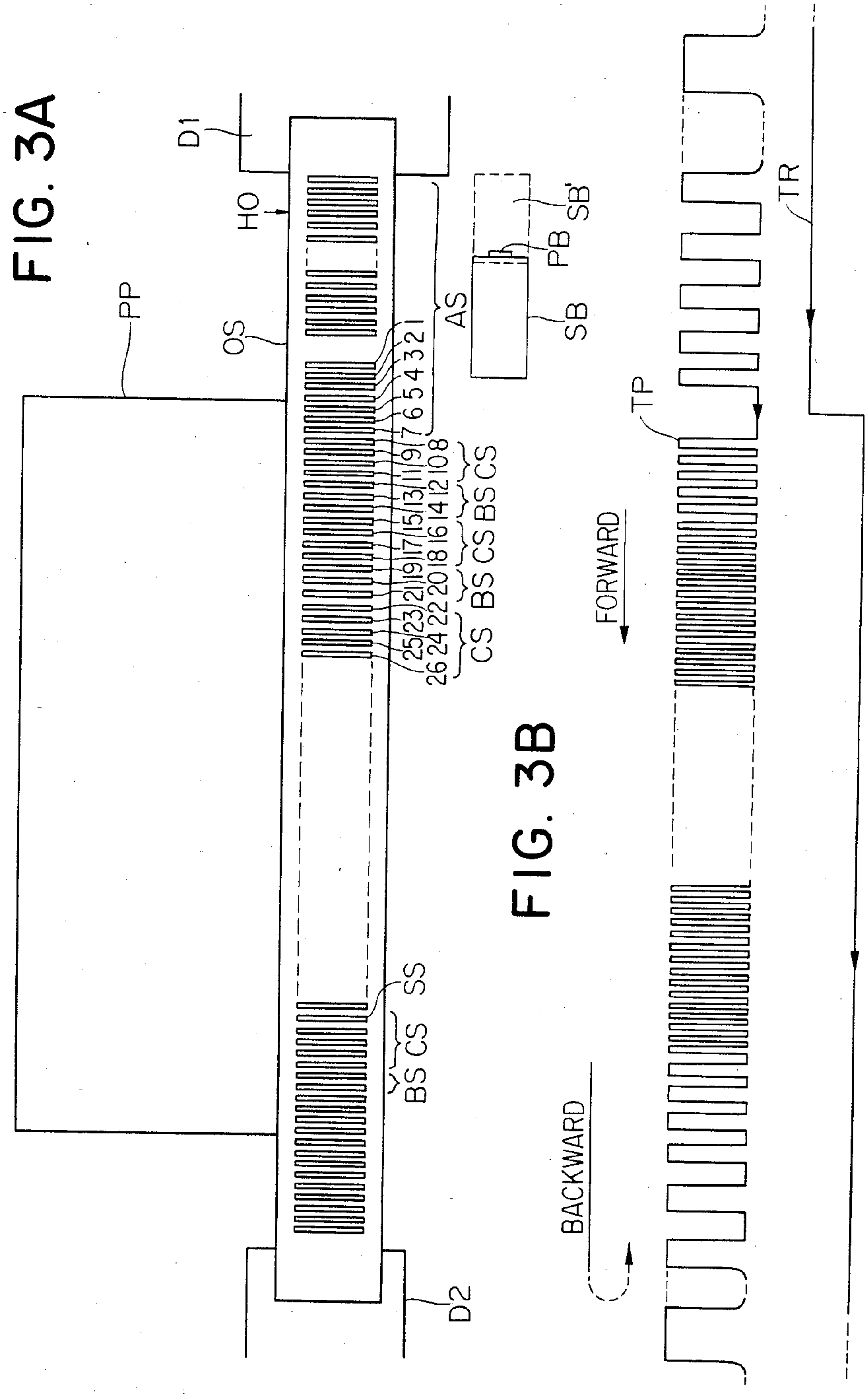
FIGS. 3A, 3B and 3C show diagrams illustrating manners of control of the movement of a carriage by a slit plate in the embodiment of FIGS. 1 and 2.

One embodiment of the recording apparatus of the present invention which significantly simplifies a construction over a prior art recording apparatus is shown in FIGS. 1 and 2. In the illustrated arrangement, a record head having three ink jet nozzles N1–N3 and a sub-tank ST is mounted on a carriage CA, which is driven by a linear motor. The linear motor comprises a closed magnetic circuit including a permanent magnet PM, a magnetic plate Y1 and a magnetic sliding shaft Y2, and a current is supplied to a coil C which is wound on a coil bobbin CB which is slidable along the magnetic sliding shaft Y2 so that the carriage CA which is in union with coil bobbin CB is slid by the Flemming's left hand law in the direction determined by a polarity of the current, the carriage CA being reciprocated along the sliding shaft Y2 by reversing the polarity of the current supplied to the coil C. A scale plate such as a slit plate OS made of nonmagnetic material is fixed to the magnetic plate Y1 such that the scaling slits are perpendicular to the sliding shaft Y2 for use in the position control of the carriage CA. Fixed to the carriage CA are the coil bobbin CB of the coil C, the ink jet nozzles N1–N3, the sub-tank ST for supplying ink to the nozzles N1–N3, a photo-sensing device such as a phototransistor PT and a flexible wiring board FL. A shield plate SB for interrupting an optical path between a photo-diode LB and a photo-transistor PB located at the home position of the carriage CA is also mounted in union with the carriage CA. Electrically and mechanically connected to one terminal FL1 of the flexible wiring board FL are terminals C1 and C2 of the coil C, terminals (not shown) of piezo devices PZ1–PZ2 which are drive sources for the ink jet nozzles N1–N3, a terminal LET of the photo-diode LE and a terminal PTT of the photo-transistor PT. The other terminal FL2 of the flexible wiring board FL is fixed, together with ink supply tubes T1 and T2, by a holding plate P. The ink supply tubes T1 and T2 extend rearwardly through an air gap between the permanent magnet PM and the magnetic plate Y1, and rear ends thereof are connected to main tanks MT1 and MT2 to supply the ink to the sub-tank ST. The main tank MT1 stores colored ink primarily used for printing and the main tank MT2 stores colored ink which is used for auxiliary printing or used for special printing. The slit plate OS is arranged perpendicularly to a record head N between the photodiode LE and the photo-transistor PT so that the space required is reduced and the apparatus is made more compact. As the carriage CA is moved, an infrared ray emitted from the photo-diode LE passes through the slit plate OS having slits arranged at a constant pitch and a receiving slit plate QS mounted at a light sensing area of the photo-transistor PT to respectively turn on and off the photo-transistor PT to produce a timing pulse TP as shown in FIG. 3B. The speed and the position of the carriage CA in a scan operation are detected by the timing pulse TP to control the scan speed, the ejection of the ink by the ink jet nozzles and rotation of a paper feed pulse motor SP. As the shield plate SB is moved by the movement of the carriage CA, the photo-transistor located at the home position is turned on and off to indicate the presence or absence of the carriage CA at the home position.

When one line of printing is to be made by the recording apparatus of the present invention thus constructed, with each character being formed by a dot matrix, the carriage CA starts scanning by a print command signal, the position of the carriage CA is detected by the timing pulse TP, voltages are applied to the piezo devices PZ2 and PZ3 associated with the ink jet nozzles N2 and N3 at predetermined positions of the carriage CA to eject ink drops to print primary character in order to print two dot lines on a print paper PP in an arrangement shown in FIG. 3A. After the two dot lines have been printed, the paper feed pulse motor SP is rotated by two dot pitches and the carriage CA is returned to the home position. The return of the carriage CA to the home position is detected by the photo-transistor PB. To feed the paper, the rotation of the pulse motor SP is transmitted from a motor shaft gear (not shown) through reduction gears G1 and G2. The final stage gear G2 is fixed to a shaft of a platen PL so that the print paper PP can be fed in a direction of line by a predetermined distance. The above paper feed operation is repeated until a predetermined number of dot lines, for example, seven dot lines are printed, when the platen PL is rotated by the pulse motor SP by a predetermined distance including a line space.

Thus, one line of printing is completed. When the auxiliary printing is to be made, a voltage is applied to the piezo device PZ1 for the ink jet nozzle N1 to eject ink drops to print one dot line on the print paper PP, and after one dot line has been printed, the paper feed pulse motor SP is rotated by one dot line pitch and the carriage CA is returned to the home position. When a predetermined number of dot lines have been printed, the platen PL is rotated by the pulse motor SP by the predetermined distance including the line space. Thus, one line of printing is completed. After the print operation, the ink jet nozzles N1–N3 are moved to the position of a cap KP and stopped there so that clogging, drying and meniscus retraction of the ink jet nozzles are prevented.

D1 and D2 shown in FIG. 3A denote collision buffering dampers which are made of foaming material and relieve the collision of the carriage CA and prevent the leakage of the inks from the nozzles and the meniscus retraction. As shown by a broken line in FIG. 1, the sub-tank ST is divided into a chamber ST1 to store ink of a first color which is used for the primary printing and a chamber ST2 to store ink of a second color which is used for the auxiliary printing. The volume of the chamber ST1 is larger than that of the chamber ST2 depending on the number of nozzles or the quantity of ink used for the primary printing. Since the sub-tank ST is arranged not to directly contact the magnetic plate Y1 or the damper D1, the impact is not substantially transmitted to the sub-tank ST and the foaming of the ink in the sub-tank ST is prevented. The quantity of the first color ink in the main tank MT1 which supplies the ink to the chamber ST1 through the ink supply tube T1 is larger than the quantity of the second color ink in the main tank MT2 which supplies the ink to the sub-tank ST2 through the ink supply tube T2 so that the entire main tank MT is made compact without waste.

As described above, according to the recording apparatus of the present invention, the nonmagnetic scale plate is arranged perpendicularly and the sizes of the main tank and the sub-tank are designed to make the apparatus small and light and simple in structure. Since no separate motor is used to drive the carriage, a gear, a link and a rack are not necessary. Since the paper feeding mechanism does not use a ratchet or a plunger, a very quiet recording apparatus is provided. Since the scale plate is mounted vertically, no dust or paper flake deposits thereon, and the scale plate flexes less than when it is horizontally mounted. Accordingly, resistance to the movement of the carriage is lower.

Since the sub-tank and the flexible wiring board are mounted on the carriage and various electric parts are connected to the wiring board, the recording apparatus can be readily manufactured at a low cost. The flexible wiring board permits free movement. Since the ink supply tubes to the sub-tank on the carriage are held at one point, the construction is simplified.

In the above embodiment, the scale plate OS is provided with the slits SS as shown in FIG. 3A for controlling the position detection and the speed of the carriage movement. As shown in FIG. 3A, the slits SS extend beyond the length of the print paper PP and the speed is adjusted before the carriage CA is moved through eight slits SS starting from the initial home position HO, with reference to the first color ink nozzle N2, and at the eighth slit, the printing of a first digit is started and it is completed in a period of the eighth to twelveth slits. The thirteenth and fourteenth slits are left blank for a space between adjacent digits. The above print operation is thereafter repeated. AS in FIG. 3A denotes approach slits for detecting a start of print position and BS denotes blank slits for detecting blanks between characters. The speed of the movement of the carriage CA is controlled constant by those slits and the intervals thereof. The slits at a position at which the signal from the photo-transistor PB changes from off state to on state as carriage CA is moved from the home position have widths corresponding to variations of the position and the speed. A drive power supply for the linear motor has two voltages. In a normal print mode, the linear motor is driven by a normal voltage, and in a waiting mode in which the carriage CA is always urged to the right end the linear motor is driven by a voltage one-half the normal voltage. When the drive power supply is turned on, the carriage CA is driven in the retracting direction to the right end as viewed in FIG. 1, and when the movement of the carriage CA to the home position is detected by the output signal from the photo-transistor PB, the motor drive voltage is switched to the low voltage so that the carriage CA is urged to the damper D1 at a reduced speed and the carriage CA is stopped at the position of the cap KP. If the carriage CA is at the home position at the start of the application of the drive voltage, the motor is driven by the low voltage and the carriage is set to the waiting mode. After one line of printing has been completed, the carriage CA is retracted to the home position, and when the retraction is detected, the drive voltage is switched to the low voltage and the carriage CA is urged to the damper D1 and held at that position. In this manner, the protection of the nozzle and the recovery of the nozzle by the forced attraction are assured.

FIG. 4 shows an embodiment of the control circuit in the recording apparatus of the present invention. Lead wires FF, FB, FV, FT, FP1–FP3 and FE for connecting the carriage CA, encircled by a broken line block at the right end of FIG. 4, are connected in union by the flexible wiring board FL1 as shown in FIG. 1 to facilitate the movement of the carriage CA. When power is turned on in the circuit of FIG. 4, a controller CC sets a signal line l2 to "0" for a predetermined time interval to reset a flip-flop F1 and a speed controller SC, and sets counters R7C and B7C to initial states, clears a print digit counter PC, a shift register 5SR and a TP separation circuit TB, and sets a counter 5C to its initial state. It also sets a power supply voltage switching signal line lSV to "0" to turn off a transistor TRS so that the normal drive voltage is applied to a motor to move the carriage CA to the home position CA. It sets a coil drive signal output line lF to "0" and sets a signal line lB to "1", and drives the carriage CA in the retracting direction to the home position through the speed controller SC and a motor driver MD. Then, the controller CC checks if the carriage CA is at the home position, by a signal line lTR which indicates the home position. If the carriage CA is not at the home position, the controller CC drives the carriage CA in the retracting direction while it speed-controls the carriage CA, and when the shield plate SB which is in union with the carriage CA shields the photo-diodes LB, the photo-transistor PB which has been maintained in the on state by the photo-diode LB is turned off to change an output thereof from "0" to "1". This output is supplied to the amplifier AP2 through a signal line lTR and an output thereof is supplied to the controller CC through a signal line lBC so that the controller CC detects that the carriage CA is at the home position. The controller CC changes a signal level on a signal line lSV from "0" to "1" to turn on the transistor TRS to short a voltage across a zener diode ZD2 so that a voltage LMV supplied to the motor driver MD is switched to the low voltage. The controller CC keeps the motor drive signal lines lF and lB in "0" and "1" states, respectively, to keep the carriage CA urged to the right end. By the switching to the low voltage, the heat generation of the coil and the power consumption are reduced. If the carriage CA is at the home position from the beginning, the photo-transistor PB is in the off state and the signal level is "1". Therefore, the motor drive voltage is instantly changed to the low voltage to urge the carriage CA to the damper D1 of the foaming material at the right end.

Figure 5A:
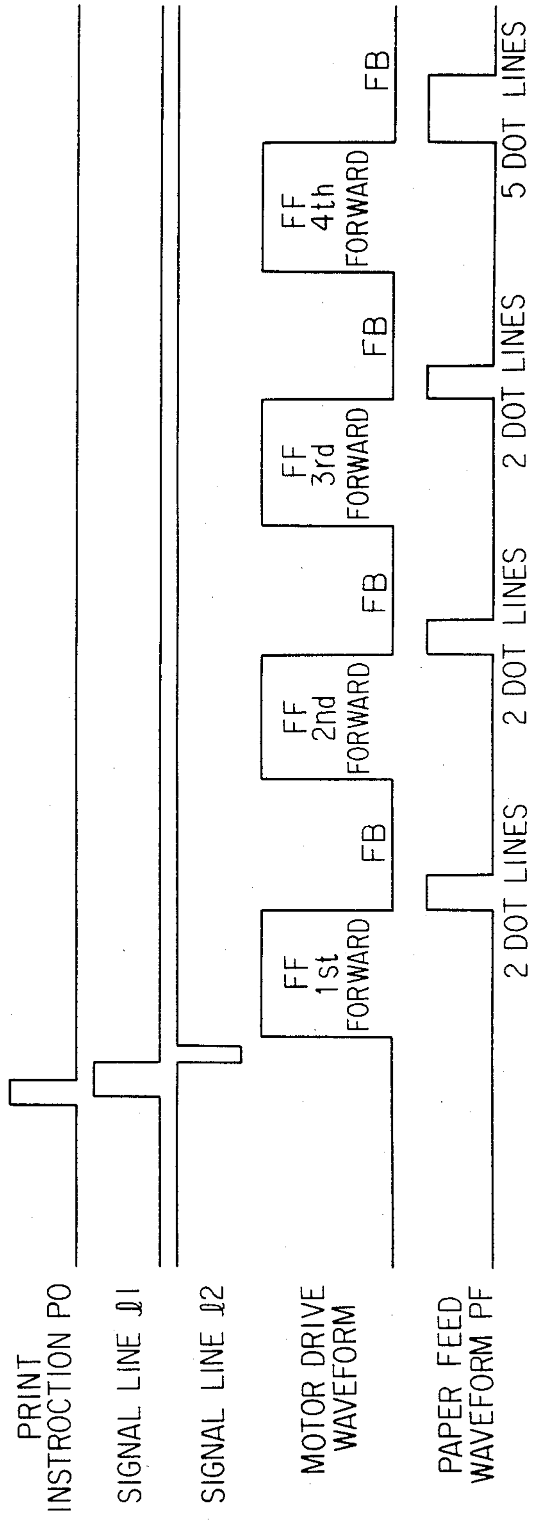
FIGS. 5A, 5B, 5C and 5D show waveforms at various points of of the circuit of FIG. 4.

Information of characters to be printed is stored in a print character memory from a keyboard KB through an arithmetic unit ALT. When a flip-flop F1 is set by a print command signal PO as shown in FIG. 5A, the controller CC is set to a print control mode by a set output signal line l1. The controller CC sets the signal line l2 to "0" for the predetermined time interval to reset the flip-flop F1 and the speed controller SC, sets the counter R7C and B7C to initial states, clears the print digit counter PC, the shift register 5SR and the TP separation circuit TB through the gate AR, and sets the counter 5C to its initial state. The controller CC also changes the signal line lSV from "1" and "0" to turn off the transistor TRS to return the motor drive voltage LMV to the normal voltage, and sets a signal line lRC to "1" to close a gate ARD, and checks if a flip-flop F2 is set or not, by a signal line lRS. The flip-flop F2 is set by a signal PRED if the piezo device PZ1 of the nozzle N1 is activated when the printing is made by the second color ink. Assuming that the flip-flop F2 is not set because of the primary printing, the controller CC detects it through the signal line lRS and sets a signal line lBLR to "1" and sets a signal line l4 to "1" to close a gate AC. The content of the print digit counter PC and a content of a print digit register PR are compared by a coincidence circuit CO, and a coincidence output signal therefrom is detected by the controller CC through a gate AC and a line l5. If the inputs to the coincidence circuit CO are not coincident, the controller CC sets the signal line lF to "1" and sets the signal line lB to "0" so that the coil C is energized through the speed controller SC and the motor driver MD to move the carriage CA forwardly to carry out the printing.

Assuming that the content of the print digit counter PC is 0 and the content of the print digit register PR is n, the coincidence circuit CO produces the non-coincidence signal; and the controller CC detects the signal and drives the carriage CA in the manner described above. Thus, as the carriage CA is moved forwardly, the shield plate SB which is in union with the carriage CA is moved out of the area between the photo-diode LB and the photo-transistor PB and no longer interrupt the photo-transistor PB. Thus, the photo-transistor PB is turned on from the off state, that is, it changes from "1" to "0". As the photo-transistor PB is turned on, the signal line lBC is changed to "0", which is inverted to "1" by an inverter ITR and it is supplied to a gate AT. As the carriage CA is moved, the detector LE, PT mounted on the carriage CA is moved on the opposite sides of the slit plate OS and produces the timing pulse TP as a slit detection signal, which is supplied to an amplifier A1, which is turn produces an output on a signal line lTP. Accordingly, the signal line lTP applied to the gate AT is "1", the signal applied from the inverter ITR to the gate AT is "1" and the signal applied from the signal line lF to the gate AT is "1". Accordingly, the output of the gate AT is "1" and gates ATP and STP are closed thereafter. Since the signal line lBLR is "1" by the state of the flip-flop F2, the "1" output of the gate ATP is supplied to the TP separation circuit TB through an OR gate OTP. Accordingly, the timing pulse TP is applied to the TP separation circuit TB.

Figure 5B:
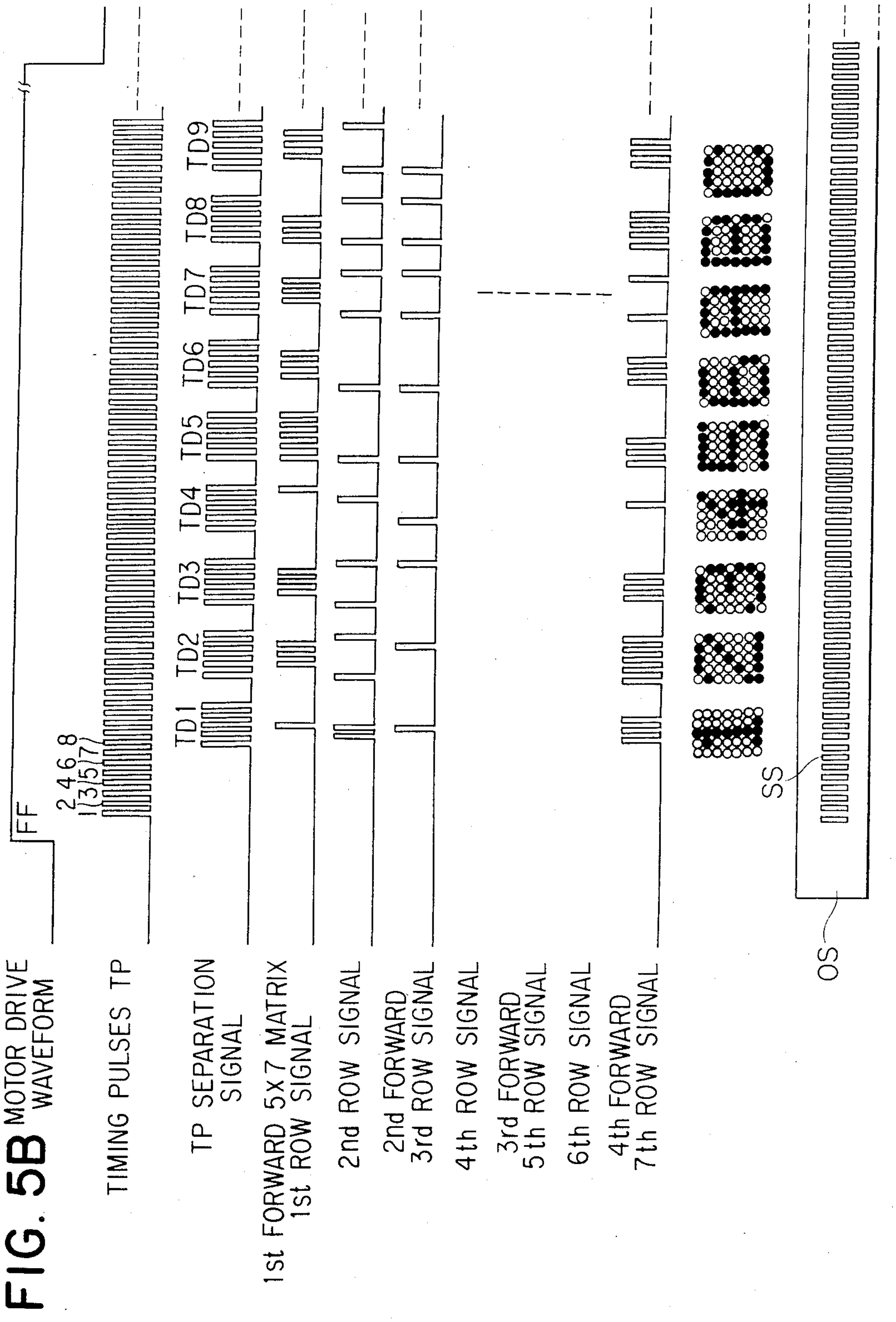

In this manner, the input timing pulse TP is separated by the TP separation circuit TB into print data output signals TD1–TDn each comprising five pulses for each digit of the character, as shown in FIG. 5B, and they are supplied to the counter 5C and gates BA8, BA9 and RA8 through a signal line l6, and an output of the counter 5C is supplied to a character generator CG. The TP separation circuit TB also supplies a signal line l13 which is "1" from the beginning of printing to the controller CC and a gate AiS. The controller CC responds to the signal on the signal line l13 and the input separating the second color ink on the signal line lRS to keep the counter R7C unchanged and increment only the counter B7C by one. The count of the counter B7C is supplied to a decoder DC2 an output of which closes a specified one of the gates BA1–BA7 for printing the primary first color ink.

The number of digits in one line is stored in the print digit register PR. The number of digits printed is counted by the print digit counter PC and the count thereof is supplied to the decoder DC1 which selects a content of the print character memory CM and supplies the selected content to the character generator CG, which produces a print data signal comprising five columns by seven row dots in a 5×7 dot matrix under the control of the count output from the counter 5C.

When the motor is driven to advance the carriage CA and the timing pulse TP is generated and supplied to the TP separation circuit TB and the first one of the five pulses for the digit of the character is supplied to the signal line l6, the counter 5C is incremented by one from the initial count and the print data comprising the seven dots in the first column of the character dot matrix is supplied to the signal lines l91–l97 from the character generator CG and they are supplied to the gates BA1–BA7 and RA1–RA7. The output of the decoder DC2 is supplied to the other inputs of the gates BA1–BA7 and the output of the decoder DC3 is supplied to the other inputs of the gates RA1–RA7. The decoders DC2 and DC3 produce the outputs in accordance with the count outputs of the counters B7C and R7C, respectively. As described above, the controller CC increments the counter B7C by one in response to the detection signal from the signal line lRS by the output on the signal line l13 which is "1" from the beginning of the printing. Accordingly, the controller CC sets the signal line Bl1 to "1" to close the gates BA1 and BA2 to supply the print data for the dot line 1 and the dot line 2 to the gates BA8 and BA9, respectively. The signal from the signal line l6 is also supplied to the gates BA8 and BA9. On the other hand, the signal on the signal line l12 is supplied to the gate AiS together with the signal on the signal line l13 which is "1" from the beginning of the printing. Thus, the signal on the signal line l12 passes through the gate AiS and is supplied to a strobe signal generator SCR, and a strobe signal generated in accordance with the input thereto is supplied to the gates BA8, BA9 and RA8 through a signal line lSR. Accordingly, of the seven-dot-by-column character data generated by the character generator CG, the data for the dots 1 and 2 which passed through the gates BA1 and BA2 which are now closed by the "1" signal on the signal line Bl1 pass through the gates BA8 and BA9 during a time period in which the signal line l6 is "1" and a time period in which the strobe signal is produced, respectively, and they drive the piezo devices PZ2 and PZ3 of the nozzles N2 and N3, respectively, through pulse width setting circuits DS2 and DS3 and the drivers PD2 and PD3, respectively, to print the dots.

Figure 6A:
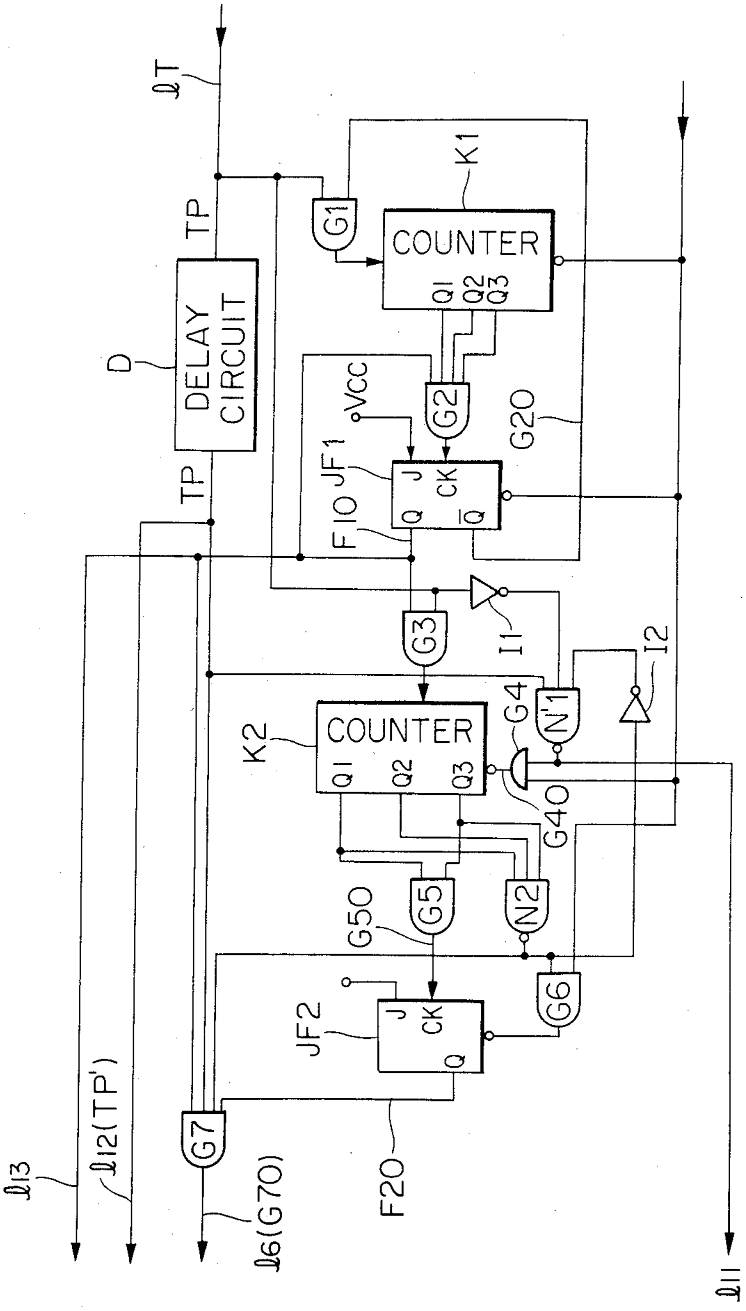
FIGS. 6A and 6B show a block diagram and waveforms, respectively, of a timing pulse separation circuit in the circuit of FIG. 4.

The timing of the print control operation will now be explained. In response to the signal line l13 which is "1" from the beginning of the printing and supplied from the TP separation circuit TB, the controller CC increments the counter B7C by one so that the output signal line Bl1 of the decoder DC2 assumes the value "1" and the gates BA1 and BA2 are closed. The controller CC supplies the five-pulse signal to the gates BA8, BA9 and RA8 and the counter 5C through the signal line l6, and the counter 5C is incremented by one by the first pulse of the five-pulse signal and the character generator CG produces the character data and the first inputs of the gates BA8, BA9 and RA8 are set to "1". When the signal line Bl1 from the decoder DC2 first assumes "1", the outputs of the gates BA1 and BA2 remain unchanged, but the character data is thereafter generated from the character generator CG and it is supplied to the second inputs of the gates BA8 and BA9. The counter R7C is not incremented because of the primary printing and hence the gates RA1–RA7 are not closed by the output of the decoder DC3. Accordingly, a "0" signal indicating no character data is supplied to the other input of the gate RA8. Since a signal TP′ on a signal line l12 from the TP separation circuit TB routes a delay circuit D as shown in FIG. 6A, it is produced from the TP separation circuit TB after the five-pulse signal on the signal line l6. Accordingly, when the strobe signal of the strobe signal generator SCR which is driven by the AND output of the AND gate AiS to which the signals on the signal lines l12 and l13 are supplied is supplied through the signal line lSR, the gates BA8, BA9 and RA8 are closed and the output signals therefrom are supplied to the pulse width setting circuits DS2, DS3 and DS1, respectively. Since no signal is applied to the other input of the gate RA8 because of the primary printing, the AND output is not supplied to the pulse width setting circuit DS1. Accordingly, only the piezo devices PZ2 and PZ3 of the nozzles N2 and N3 which are connected to the pulse width setting circuits DS2 and DS3 through the drivers PD2 and PD3 are activated to eject ink drops to effect printing.

Figure 6B:
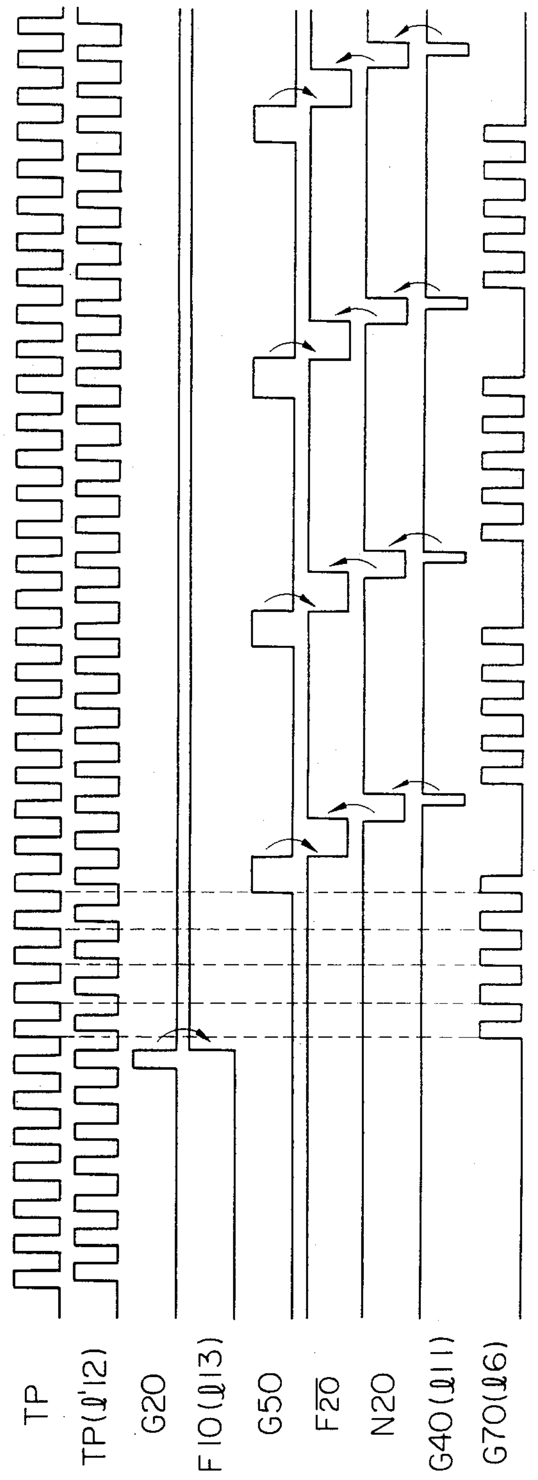

The TP separation circuit TB shown in FIG. 4 may be constructed as shown in FIG. 6A, comprising a delay circuit D, counters K1 and K2, JK flip-flops JF1 and JF2, AND gates G1–G7, NAND gates N1′ and N2′ and inverters I1 and I2. The circuit sends out the group signals TD1–TDn on the output signal line l6, as will be explained in connection with the timing chart of FIG. 6B.

In the above description, the upper two dots of the seven dots in the first column of the five columns in the 5×7 dot matrix, are printed for the first digit of one line of print digits. When the upper two dots of the first column of one digit of character have been printed, the counter 5C is incremented by one by the second pulse of the five-pulse signal on the signal line l6 and the seven dots of the second column in the next character data of the 5×7 dot matrix from the character generator CG are printed in the same manner. Thereafter, the counter 5C is similarly incremented by the third to fifth pulse signals and the character data of the third to fifth columns of the 5×7 dot matrix in the first digit of character are printed. Then, the signal line l6 is set to "0" until the next five-pulse signal is produced on the signal line l6, and the first inputs of the gates BA8 and BA9 are kept "0". Accordingly, although the strobe signal generator SCR which is driven by the signal on the signal line l12 produces the strobe signal, an intercharacter blank or space is formed during that period.

On the other hand, the controller CC detects the ends of the five-pulse signal and the blank output by the output signal line l11 from the TP separation circuit TB and increments the print digit counter PC by one by the signal line l7 and sets the counter 5C to its initial state through an inverter i5C. It also compares the contents of the print digit register PR and the print digit counter PC by the coincidence circuit CO, and supplies the coincidence output and the signal on the signal line l4 from the controller CC to a gate AC to produce an output signal on the signal line l5. When the controller CC detects the non-coincidence, it increments the print digit counter PC by one so that the character data in the print character memory CM corresponding to the count output of the print digit counter PC is printed in response to the five-pulse signal TD from the TP separation circuit TB.

The operation from the increment of the print digit counter PC to the readout of the character memory CM and the input to the character generator CG can be completed before the next five-pulse signal arrives because the operation clock of the circuit is sufficiently faster than the rate of the timing pulse TP. In this manner, the respective five-dot groups in the first and second rows in one line of 5×7 dot matrix are selectively printed by the signals TD3, TD4, . . . TDn, and the content of the print digit counter PC and the content of the print digit register PR are compared during one line of printing. When the controller CC sets the signal line l4 to "1" to close the gate AC and detects the coincidence by the signal line l5, the controller CC detects by non-"1" of the signal line Bl4 that the seventh dot line of the 5×7 dot matrix has not been printed, and the controller CC sets the signal line l8 to "1" for a predetermined time period to activate the driver PFD to cause it to feed the paper by two-dot pitch, and also clears the print digit counter PC, the TP separation circuit T13 and the shift register 5SR through the gate AR and sets the counter 5C to its initial state.

The controller CC then sets the signal line lF to "0" and sets the signal line lB to "1" to retract the carriage CA through the speed controller SC and the motor driver MD so that the carriage CA is returned to the home position. Through the backward movement, the carriage CA is moved to the home position while it is speed-controlled, and the photo-transistor PB which has been kept on by the photo-diode LB is turned off (from "0" to "1") by the shield plate SB which is integral with the carriage CA. The output line lTR from the photo-transistor PB is supplied to the amplifier AP2 and the signal line lBC therefrom is supplied to the controller CC, which detects the return of the carriage CA to the home position and sets the signal line lB to "0" to stop the backward movement of the carriage CA. When the carriage CA is driven backwardly, the signal line lF is "0" and the gate AT is open. Therefore, the signal TP is not applied to the TP separation circuit TB and hence the printing is not effected during the return of the carriage CA.

The controller CC detects by the signal line Bl4 that the seventh dot line of the 5×7 dot matrix has not been printed, as described above. Therefore, the printing of the next dot line is carried out. The count of the print digit counter PC is "0", the counter 5C is set to the initial state and the shift register 5SR and the TP separation circuit TB are cleared, and the third and fourth rows of the 5×7 dot matrix are printed in the same manner as the first and second rows. The controller CC sets the signal line lF to "1" and sets the signal line lB to "0" to activate the motor driver MD such that the carriage CA is driven forwardly. Since the signal line lF is "1", the gate AT is closed to block the "1" input.

As the carriage CA is driven forwardly, the shield plate SB which is in union with the carriage CA is moved out of the area between the photo-diode LB and the photo-transistor PB and the output line lTR of the photo-transistor PB is supplied to the amplifier AP2 and the output line lBC thereof changes from "1" to "0", which is then supplied to the gate AT through the inverter ITR to close the gate AT. Thus, the signal detected by the detector LE, PT as the carriage CA is moved is supplied to the amplifier AP1 through the signal line FT and the amplifier AP1 produces the timing pulse TP on the signal line lTP, which is supplied to the TP separation circuit TB through the AND gates AT and ATP and the OR gate OTP. The TP separation circuit TB counts the input timing pulse TP and the signal line l13 is set to "1" when the printing is started after the approach slits have been counted. Thus, the controller CC increments the counter B7C by one in response to the detection of the signal on the signal line lRS and sets the output line Bl1 of the decoder DC2 to "0" and sets the output signal line Bl2 to "1" to close the gates BA3 and BA4 for the third and fourth rows of the 5×7 dot matrix. The TP separation circuit TB groups the five-pulse TP separation signals TD1–TDn and produces them on the output signal line l6. The counter 5C is operated by the five-pulse signal and the count output of the counter 5C is supplied to the decoder DC to select the character pattern signal for the first digit of character outputted from the print character memory CM, from the character generator CG, and the character pattern signal is supplied to the gates BA1–BA7 and RA1–RA7. Since the signal line Bl1 is now "1", the print data for the third and fourth rows of the 5×7 dot matrix are gated through the closed gates BA3 and BA4. The signal line l13 which is "1" from the start of the printing and the signal line l12 are supplied to the gate AiS and the AND output from the gate AiS is supplied to the strobe signal generator SCR to generate the strobe signal, by which the gates BA8 and BA9 are closed and the signals therefrom are supplied to the pulse width setting circuits DS2 and DS3 to drive the drivers PD2 and PD3 for the predetermined time period so that the piezo devices PZ2 and PZ3 for the nozzles N2 and N3 eject ink drops for the first column of the 5×7 dot matrix for the first digit of character. Then, in response to the five-pulse signal produced as the carriage CA is moved, the third and fourth dot lines of the first row are printed. Similarly, the third and fourth rows of the 5×7 dot matrix are printed by the member of print digits. When the controller CC detects the end of the print data output for the fourth row, the controller CC detects that the seventh dot line of the 5×7 dot matrix has not been printed by the fact that the signal line Bl4 is not "1" and causes the paper to be fed by two-dot pitch by the signal line l8 and drive the carriage CA backwardly to return it to the home position, and increments the counter B7C by one to print the next rows, that is, the fifth and sixth rows of the 5×7 dot matrix in the same manner as described above. After the fifth and sixth rows have been printed, the controller CC increment the counter B7C by one because the signal line Bl4 is not "1" and the seventh row is printed. In the seventh row printing, when the signal line l13 from the TP separation circuit TB is changed to "1" by the timing pulse TP, the controller CC increments the counter B7C by one so that the output signal line Bl4 of the decoder DC2 is changed to "1". Since the signal lines Bl1, Bl2 and Bl3 are all "0", only the gate BA7 is closed and the seventh row of the 5×7 dot matrix is printed in accordance with the five-pulse signal from the signal line l6. After the seventh row has been printed, the signal line Bl4 is set to "1" and the controller CC detects that seven rows of the 5×7 dot matrix have been printed. Thus, the controller CC sets the signal line Bl8 to "1" for the predetermined time interval to drive the driver PFD so that the paper is fed by five-dot line pitch including the line space. The print digit counter PC, the shift register 5SR and the TP separation circuit TB are cleared through the gate AR and the counter 5C is set to its initial state. The controller CC sets the signal line lF to "0" and sets the signal line lB to "1" to reversely move the carriage CA, which is driven until the output of the photo-transistor PB on the signal line lBC changes from "0" to "1" so that the carriage CA is returned to the home position. In this manner, one digit of printing is completed.

As described above, the paper feeding and the return of the carriage CA to the home position are carried out parallelly. When the carriage CA is returned to the home position, the controller CC checks the output signal line l1 of the flip-flop F1 and determines if the next print command has arrived or not depending on "1" or "0" state of the signal line l1, and if the output signal line l1 of "1" the controller CC determines that the next print command has arrived to effect continuous printing, and sets the signal line lB to "0" to stop to drive the motor and sets the flip-flop l2 to "0" for the predetermined time interval to reset the flip-flop F1 and the speed controller SC and sets the counters R7C and B7C to their initial states, clears the print digit counter PC, the TP separation circuit TB and the shift register 5SR through the gate AR and sets the counter 5C to its initial state. The controller CC also sets the signal line lRC to "1" to close the gate ARD, checks if the flip-flop F2 is in the set state, and if the controller CC detects by the signal line lRS that the flip-flop F2 is not set, it sets the signal line lBR to "1" and sets the signal line l4 to "1" to close the gate AC and compares the content of the print digit counter PC and the content of the print digit register PR by the coincidence circuit CO to effect printing in the same manner as described above. If the output signal line l1 from the flip-flop F1 is "0", the controller CC detects the absence of the next print command and sets the signal line lSV to "1" to turn on the transistor TRS to switch the motor drive voltage to the low voltage, and it also sets the signal line lF to "0" as the motor drive signal and keeps the signal line lB at "1" to urge the carriage CA to the right end and holds the carriage CA at the home position until the next print command arrives.

In the print operation described above, the piezo devices PZ2 and PZ3 for the primary printing are driven to eject ink drops of the first color ink from the nozzles N2 and N3. The print operation using the non-primary second color ink is now explained.

Figure 3C:
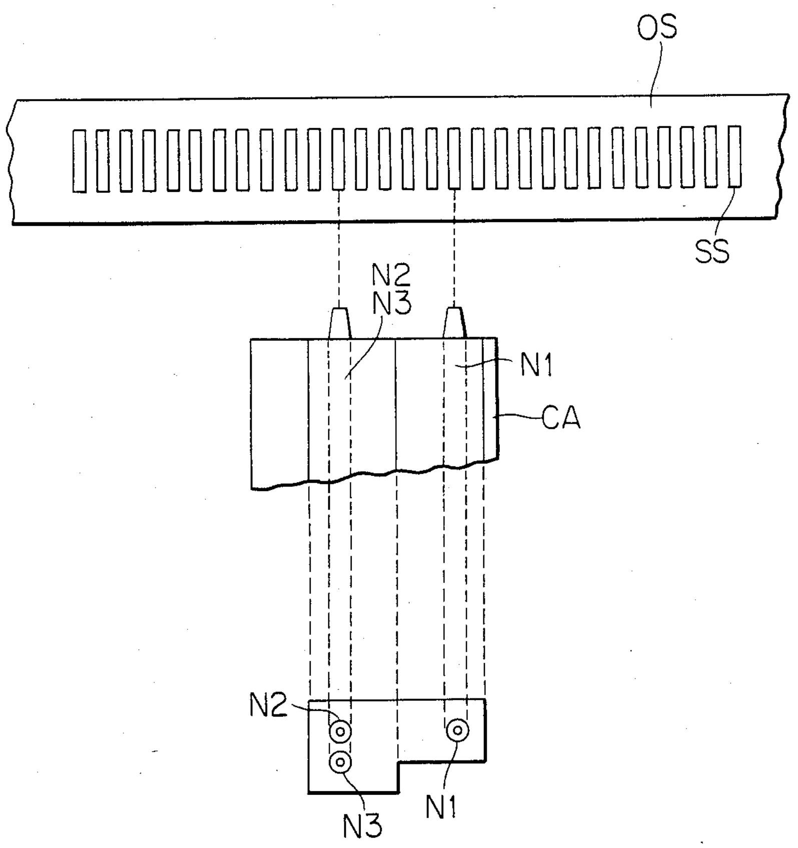
Figure 5C:
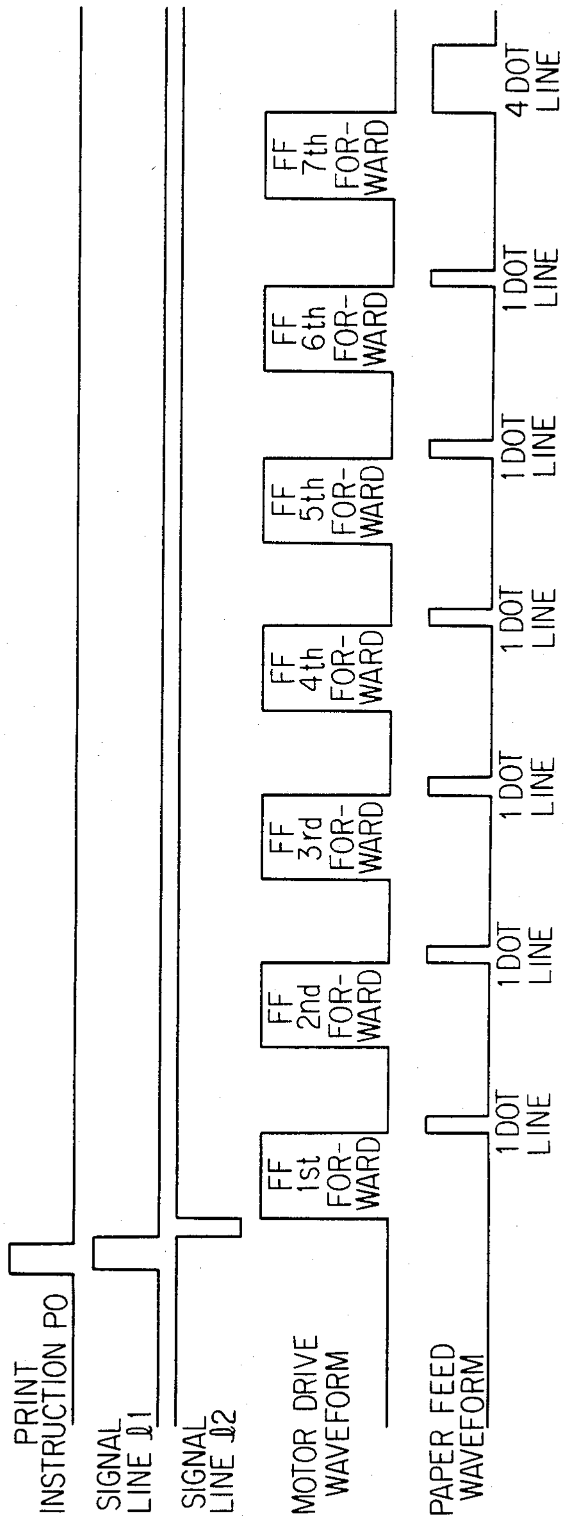

In the print operation by the non-primary second color ink, when the flip-flop F1 is set by the print command shown in FIG. 4 as shown by the signal waveform of FIG. 5C, the controller CC is set to the print control mode by the set output signal line l1 and it sets the signal line l2 to "0" for the predetermined time interval, clears the circuits in the same manner as described above, sets the counters to their initial states, and if the continuous print mode is not specified, the controller CC sets the signal line lSV to "0" to switch the motor drive voltage LMV to the normal voltage. Then, the controller CC sets the signal line lRC to "1" to close the gate ARD and checks if the flip-flop F2 is in the set state or not. Since the flip-flop F2 is now in the set state by the signal line PRED, it informs to the controller CC through the signal line lRS that the printing is to be effected by the non-primary or special second color ink. In response thereto, the controller CC sets the signal line lBLR to "0" and sets the signal line l4 to "1" to close the gate AC, and compares the content of the print digit counter PC and the content of the print digit register PR by the coincidence circuit CO through the signal line l5. If they are not coincident, printing is effected. If the content of the print digit counter PC is zero and the content of the print digit register PR is n, the controller CC detects the non-coincidence and sets the signal line lF to "1" and sets the signal line lB to "1" to drive the coil C through the motor driver MD to advance the carriage CA. As the carriage CA is moved forwardly, the shield plate SB which is in union with the carriage CA is moved out of the area between the photo-diode LB and the phototransistor PB so that the photo-transistor PB is turned on from the off state, that is, it is changed from "1" state to "0" state. As the phototransistor PB is turned on, the signal line lTR and hence the signal line lBC is changed to "0" and the "0" signal is applied to the gate AT through the inverter ITR. As the carriage CA is moved, the position of the slit SS is detected by the detector LE, PT mounted on the carriage CA and the detected timing pulse TP is applied to the signal line lTP through the amplifier AP1. The timing pulse TP is supplied to the gate AT and the TP clock pulse generator CTP which generates the clock pulse in response to the rise and the fall of the timing pulse TP, and it is also supplied to the AND gates ATP and STP through the gate AT. Since the controller CC sets the signal line lBLR to "0" as the result of checking of the state of the flip-flop F2, the gate ATP is closed and the "0" signal is applied to the gate STP through the inverter BLR so that the gate STP is closed. Thus, the signal is passed through the gate STP to the five-bit shift register 5SR. The output signal from the TP clock pulse generator CTP is applied to the five-bit shift register 5SR so that the timing pulse TP is delayed by the five-bit period. The five-bit shift register 5SR is provided in order to displace the print signal by the five-bit position because the three ink jet nozzles N1–N3 are arranged at the interval of five slits with respect to a recovery system for the nozzle clogging when the nozzles cannot eject the ink by the copying of the nozzles as shown in FIG. 3C or other causes.

Figure 5D:
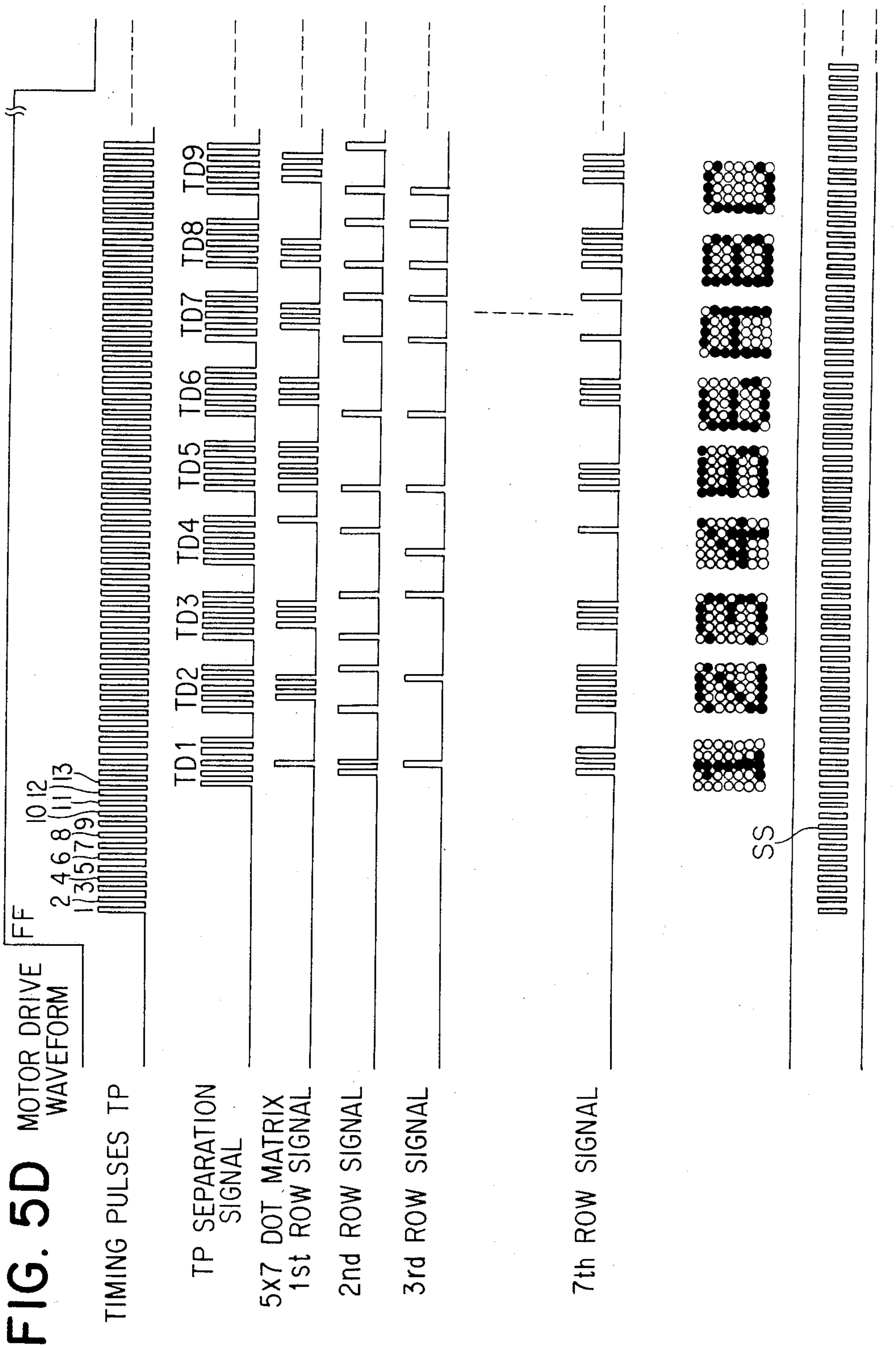

The timing pulse TP produced by the five-bit shift register 5SR with the delay of five-bit period is supplied to the TP separation circuit TB through the OR gate OTP and it is grouped into the five-pulse signals TD1–TDn for producing the print data outputs for the respective digits as shown in FIG. 5D, and those signals are supplied to the counter 5C and the gates BA8, BA9 and RA8 through the signal line l6, and the count output of the counter 5C is supplied to the character generator CG. The TP separation circuit TB produces the signal on the signal line l13 which is "1" from the start of printing, which is supplied to the controller CC and the gate AiS. The controller CC, which, in the previous case, detected that the signal line lRS representing the set or reset state of the flip-flop F2 in accordance with the input signal PRED, now responds to the signal on the signal line l13 to keep the counter B7C unchanged and increment only the counter R7C by one, and closes one of the gates RA1–RA7 for the non-primary second color ink print, through the decoder DC3.

The number of print digits in one line is stored in the print digit register PR. The print digit counter PC counts the number of character digits to be printed and supplies the count output to the decoder DC1, which selects a content of the print character memory CM so that seven-dot groups for the respective five columns of the 5×7 dot matrix are generated by the character generator CG as the character data signals under the control of the count output of the counter 5C.

As the carriage CA is moved forwardly and the first pulse of the five-pulse signal is produced by the signal line l6, the counter 5C is incremented by one from the initial state and the seven dots in the first column of the 5×7 dot matrix are produced from the character generator CG as the character data and supplied to the signal lines l91–l97, which are supplied to the AND gates BA1–BA7 and RA1–RA7. The output of the decoder DC3 is supplied to the second inputs of the gates RA1–RA7 through the signal lines Rl1–Rl7, respectively, and the output of the decoder DC2 is supplied to the second inputs of the gates BA1–BA7 through the signal lines Bl1–Bl4, respectively. The decoders DC2 and DC3 produce the output signals in accordance with the count outputs of the counters B7C and R7C, respectively. Since the controller CC has incremented the counter R7C by one as described above, it sets the signal line Rl1 to "1" to close the gate RA1 so that the character data for the first dot line or the first row of the 5×7 dot matrix is supplied to the gate RA8 through the OR gate RO, and the signal line l6 is connected to the other input of the gate RA8. As described above, since the strobe signal is supplied to the signal line lSR, the character data of one dot line which passed through the gate RA1 which is now closed by the signal on the signal line Rl1 is outputted from the gate RA8 and it is supplied to the piezo device PZ1 of the nozzle N1 through the pulse width setting circuit DS1 and the driver PD1, to effect the printing.

The printing for one dot of the uppermost row of the seven dots of the first column of the five columns in the 5×7 dot matrix of the first digit of one line of character digits has been described above. After one dot has been printed, the counter 5C is incremented by one by the second pulse of the five-pulse signal from the signal line l6 and the same print operation as described above is carried out for the seven dots of the second column of the 5×7 dot matrix generated from the character generator CG. Subsequently, the counter 5C is incremented by the third to fifth pulses, respectively, to print the character data for the third to fifth columns of the 5×7 dot matrix of the first digit. The signal line l6 is set to "0" until the next five-pulse signal is produced on the signal line l6, and the "0" signal is supplied to the gate RA8. The strobe signal is produced on the signal line 1SR but the character data is not outputted. Accordingly, an intercharacter blank is formed.

On the other hand, the controller CC detects the ends of the five-pulse signal output and the blank output by the output signal line l11 from the TP separation circuit TB and increments the print digit counter PC by one by the signal line l7, sets the counter 5C to its initial state through the inverter i5C and compares the content of the print digit register PR and the print digit counter PC by the coincidence circuit CO, and if the non-coincidence is detected, the controller CC increments the print digit counter PC by one to print the character data of the print character memory CM corresponding to the incremented digit, in accordance with the next five-pulse signal TD2 from the TP separation circuit TB. In this manner, the respective five-dot groups in the first row of the 5×7 dot matrix are printed in accordance of the sequential five-pulse signals TD3, TD4, . . . , TDn.

When the controller CC detects by the signal line l5 the coincidence of the content of the print digit counter PC and the content of the print digit register PR in one line of printing, the controller CC detects that the seventh dot line of the 5×7 dot matrix has not been printed by the fact that the signal line Rl7 is not "1" and sets the signal line l8 to "1" for the predetermined time interval to drive the driver PFD, and detects the signal on the signal line lRC to feed the paper by one dot pitch, clears the print digit counter PC, the TP separation circuit TB and the shift register 5SR through the gate AR, sets the counter 5C to its initial state, sets the signal line lF to "0" and sets the signal line lB to "1" to retract the carriage CA. The paper feeding and the retraction of the carriage CA and the return thereof to the home position are carried out parallelly as described above. As the carriage CA is retracted while it is speed-controlled, the photo-transistor PB which has been in the on state by the photo-diode LB is turned off to change from "0" state to "1" state. Thus, the controller CC detects the return of the carriage CA to the home position by the signal line lBC and sets the signal line lB to "0" to strop the backward movement of the carriage CA. The printing is not effected during the return of the carriage CA as described above.

Since the controller CC detects by the signal line Rl7 that the seven dot lines of the 5×7 dot matrix have not been printed, the printing of the next or second row is effected. As in the case of the printing for the first row, the controller CC sets the signal line lF to "1" and sets the signal line lB to "0" to move the carriage CA forwardly. As the carriage CA is moved forwardly, the shield plate SB which is in union with the carriage CA is moved out of the area between the photo-diode LB and the photo-transistor PB so that the signal line lBC changes from "1" to "0" and the gate AT is closed. Thus, the timing pulse TP generated on the signal line lTP as the carriage CA is moved is supplied to the TP separation circuit TB through the gate AT, the AND gate STP, the seven-bit shift register 7SR and the OR gate OTP. The TP separation circuit TB counts the input timing pulse TP and sets the signal line l13 to "1" from the start of printing after the approach slits have been counted. Thus, the counter R7C is incremented by one, the output signal line Rl1 of the decoder DC3 is set to "0" and the output signal line Rl2 is set to "1" to close the gate RA2 for the second row. The TP separation circuit TB groups the TP timing signals into five-pulse TP separation signals TD1–TDn, which are produced on the signal line l6. The counter 5C is operated by the five-pulse signal and the character pattern for the first digit outputted from the print character memory CM by the count output of the counter 5C is generated by the character generator CG and it is supplied to the AND gates BA1–BA7 and RA1–RA7. The character data for the second row of the 5×7 dot matrix passes through the gate RA2 which is now closed because the signal line Rl2 is "1". The gate RA8 is closed by the strobe signal so that the pulse width setting circuit DS1 is activated to drive the piezo device PZ1 of the nozzle N1 to eject the ink drop for the second dot of the first column of the 5×7 dot matrix of the first digit character pattern. As the carriage CA is further moved, the second dot line is printed by the five-pulse signal. Similarly, the second row of the 5×7 dot matrix is printed. When the controller CC detects the end of the character data for the second row by the coincidence circuit CO, the controller CC detects that the seven dot lines have not been printed by the fact that the signal line Rl7 is not "1" and feeds the paper by one dot pitch by the signal line l8 and retracts the carriage CA to return it to the home position. Similarly, in the printing for the third to seventh rows, the counter R7C is incremented by one to sequentially change the output signal lines Rl3 to Rl7 of the decoder DC3 to "1" to sequentially close the gates RA3 to RA7 to print the third to seventh rows of the 5×7 dot matrix.

When the seventh row of the 5×7 dot matrix has been printed, the controller CC detects that one line of printing for the 5×7 dot matrix has been completed by the fact that the signal line Rl7 is "1". Since the signal line lRS is also "1", the controller CC sets the signal line l8 to "1" for the predetermined time interval to feed the paper by four-dot pitch including the line space. The controller CC clears the print digit counter PC, the shift register 5SR and the TP separation circuit TB through the gate AR, sets the counter 5C to its initial state, sets the signal line lF to "0" and sets the signal line lB to "1" to move the carriage CA until the signal line lBC changes from "0" to "1" to return the carriage to the home position. Thus, one line of printing by the non-primary or second color ink is completed.

In the continuous or non-continuous printing operation, printing by the first color ink or the second color ink is determined by checking the output signal of the flip-flop F2.

The print operations by the primary or first color ink and the non-primary or second color ink have been described. In the printing by the primary or first color ink, two nozzles are used to increase the print speed, and in the printing by the non-primary or second color ink, one nozzle is used to reduce cost. Since the print head is compact, the weight thereof is reduced and the power consumption in the reciprocation of the carriage is also reduced. Further, since the number of signal wires connected to the print head is reduced, the number of manufacturing steps of the print head is reduced. By reversing the pulse motor SP after the end of the printing by the primary or first color ink to return the paper to the first dot line print position, and printing a character or a pattern by the non-primary or secondary color ink, a special mode of printing is attained.

Figure 7:
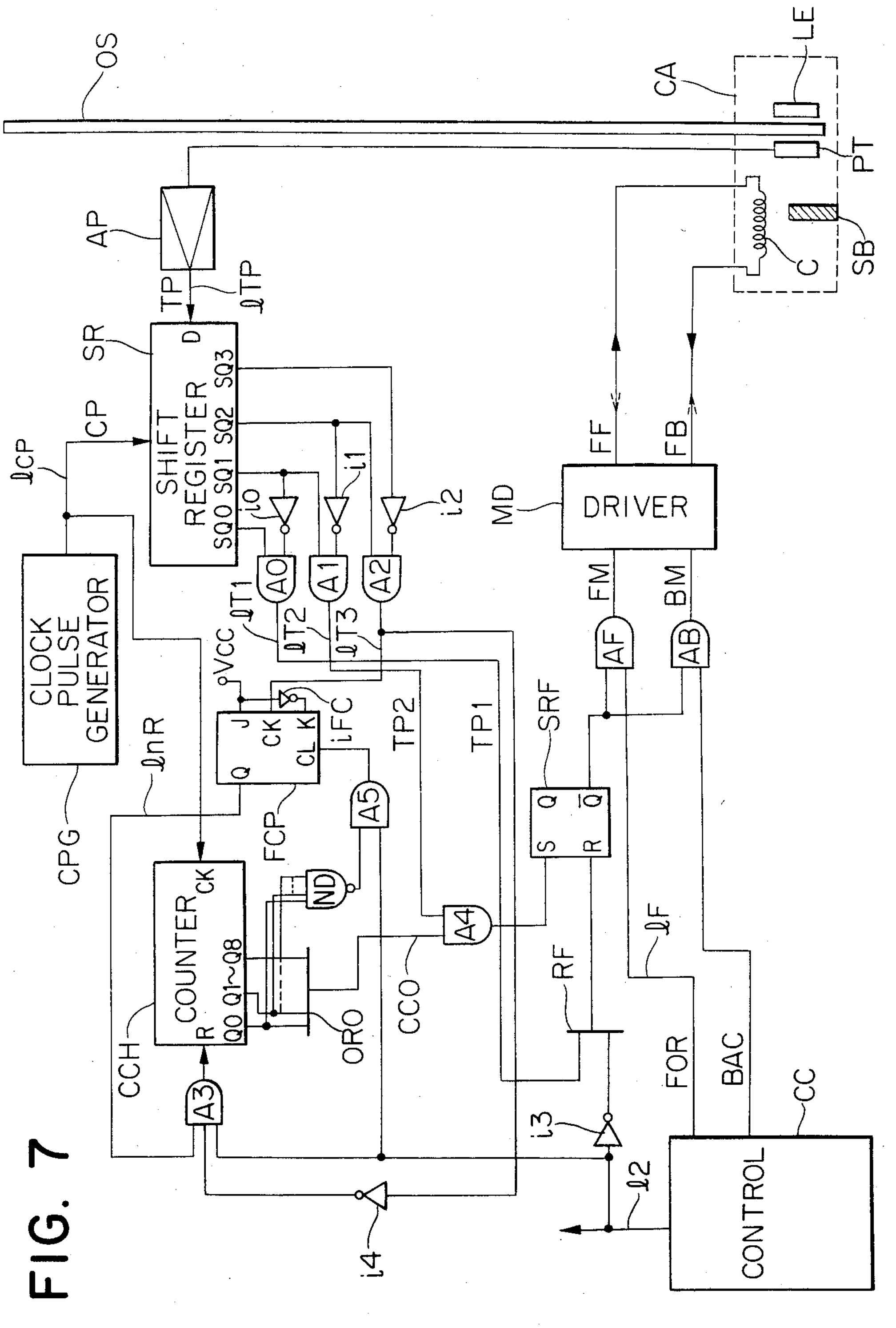
FIG. 7 shows a block diagram of a speed control circuit in the circuit of FIG. 4.
Figure 8:
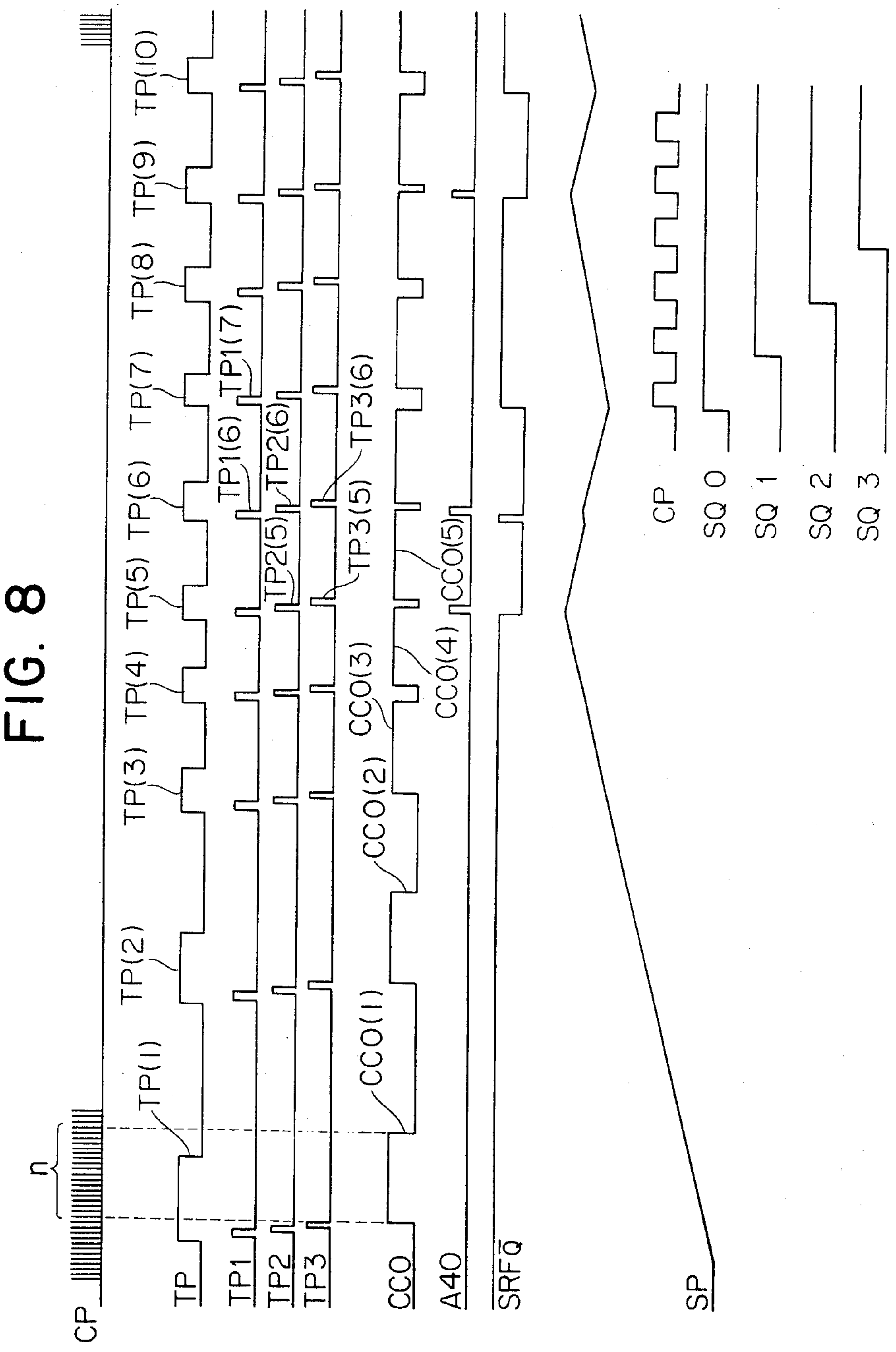
FIG. 8 shows waveforms at various points in the speed control circuit of FIG. 7.

An embodiment of the speed controller SC of FIG. 4 for controlling the speed of movement of the carriage CA is shown in FIG. 7 and an operation timing chart thereof is shown in FIG. 8. In FIG. 7, when the coil C is energized to drive the carriage CA along the slit plate OS, the timing pulse TP is produced as the slit passes through the area between the photo-diode LE and the photo-transistor PT. The timing pulse TP is supplied to an amplifier AP and an output thereof is supplied to a four-bit shift register SR through a signal line lTP. The shift register SR is driven by a clock pulse CP supplied from a clock pulse generator CPG through a signal line lCP so that delayed pulses $\theta 0$, $\theta 1$, $\theta 2$ and $\theta 3$ each delayed by one clock period are produced at parallel output terminals S$\theta$0, S$\theta$1, S$\theta$2 and S$\theta$3. Of those delayed pulses $\theta 0$–$\theta 3$, the delayed pulses $\theta 1$–$\theta 3$ are inverted by inverters i0–i2, respectively, and pairs of adjacent pulses with one of them being the inverted pulse are supplied to AND gates A0–A2, which AND the input pulses to produce delayed timing pulses TP1–TP3 which are spaced by one clock period from others, on signal lines lT1–lT3. The delayed timing pulses TP1–TP3 thus produced and the clock pulse CP and the timing pulse TP are shown in FIG. 8. Of those delayed timing pulses, the delayed timing pulse TP1 resets a flip-flop SRF through an OR gate RF, the delayed timing pulse TP2 closes an AND gate A4 for the pulse duration thereof, and the delayed timing pulse TP3 sets a flip-flop FCP which supplies a Q-output thereof to an AND gate A3 through a signal line lnR and to the AND gate A3 through an inverter i4 so that when the delayed timing pulse TP3 is turned on, a counter CCH is reset by the output of the AND gate A3 and when the delayed timing pulse TP3 is turned off, the reset of the counter CCH is released to start the count of the clock pulse CP from the clock pulse generator CPG by the counter CCH. The counter CCH is reset through the AND gate A3 when the signal line l2 from the controller CC is set to "0" for the predetermined time interval at the start of printing. The flip-flop FCP is reset through an AND gate A5 when the signal line l2 is set to "0" and the Q-output thereof is supplied to the gate A3 through the signal line lnR to keep the counter CCH reset. After the delayed timing pulse TP3 has changed from "1" to "0" to set the flip-flop FCP and set the signal line lnR to "1" and release the reset of the counter CCH, the counter CCH starts to count the clock pulse CP. When all of the parallel count outputs Q0–Q8 become "1" to change the output of a NAND gate ND "0", the counter CCH stops output of the NAND gate ND through the AND gate A5 and the counter CCH is also reset. Since the flip-flop SRF is also reset by the signal line l2 from the controller CC through the inverter i3 and the OR gate RF, one input to each of AND gates AF and AB is changed to "1" by a $\overline{Q}$-output of the flip-flop SRF so that the AND gates AF and AB are closed to pass signals from signal lines lF and lB.

As described above, the timing pulse TP is supplied from the carriage CA, the delayed timing pulse TP1–TP3 are generated, the flip-flop FCP is set by the delayed timing pulse TP3, and the counter CCH counts the clock pulse CP from the clock pulse generator CPG to sequentially produce the parallel count outputs Q0–Qn. Before the count output Qn is produced, the signal line CCO is "1" by an output of an OR gate ORO and the "1" signal is supplied to one input of an AND gate A4, but the other input of the AND gate A4 is connected to the signal line lT2 to which the delayed timing pulse TP2 is supplied. Therefore, when the speed of movement of the carriage CA is slow, that is, when the pulse interval of the input timing pulse TP such as a signal TP(1) shown in a signal waveform of the timing pulse TP in FIG. 8 is longer than the pulse interval of a signal, such as signal TP(5) in FIG. 8, produced when the carriage CA is moved at a proper speed, the delayed timing pulse TP2 which is delayed with respect to the input timing pulse TP is not produced before the count of the counter CCH reaches the count output Qn and hence the AND gate A4 is kept open. Accordingly, the flip-flop SRF is kept reset by the delayed timing pulse TP1 which is produced earlier than the delayed timing pulse TP2, through the OR gate RF. Thus, the control by the controller CC through the AND gates AF and AB is kept unchanged to continuously drive the carriage CA.

For signals TP(2), TP(3) and TP(4) in the signal waveform of the timing pulse TP of FIG. 8, the logical OR output CCO of the parallel count outputs of the counter CCH and the delayed timing pulse TP2 do not satisfy the AND function of the AND gate A4 because the speed of the movement of the carriage has not yet reached a steady state. Therefore, the drive of the motor coil C by the driver MD does not change and the carriage CA is continuously driven. The speed of the carriage CA is gradually increased and the pulse interval of the timing pulses is gradually decreased, and at a signal TP(5), the logical OR output CCO(4) of the parallel count outputs of the counter CCH and the delayed timing pulse TP2 (5) satisfy the AND function of the AND gate A4. Thus, the flip-flop SRF is set because a set input S thereof is "1". Accordingly, the $\overline{Q}$-output of the flip-flop SRF changes from "1" to "0" and the AND gates AF and AB are opened and signal lines FM and BM are changed to "0" to deactivate the driver MD to deenergize the coil C and stop to drive the carriage CA. The carriage CA moves by an inertia but it gradually decelerates, and at the next delayed timing pulse TP3 (5), the counter CCH is reset through the inverter i4 and the gate A3 and the flip-flop FCP is set and the counter CCH resumes to count. At the next delayed timing pulse TP1 (6), the flip-flop SRF is reset through the OR gate RF so that the $\overline{Q}$-output of the flip-flop SRF is changed to "1", which closes the gates AF and AB to resume the energization of the coil C.

In the signal waveform of FIG. 8, the coil C is deenergized during the period from the delayed timing pulse TP2 (5) to TP1 (6) to decelerate the carriage CA, but since the carriage CA is not yet sufficiently decelerated at the timing pulse TP (6), the logical OR signal line CCO (5) of the count outputs from the counter CCH and the delayed timing pulse TP2 (6) satisfy the AND function of the AND gate A4 so that the flip-flop SRF is set again to open the gates AF and AB to stop the energization of the coil C until the delayed timing pulse TP1 (7) corresponding to the next timing pulse TP (7) arrives. The counter CCH is reset by the delayed timing pulse TP3 (6) and the flip-flop FCP is set by the fall of the delayed timing pulse TP3 (6) so that the counter CCH resumes to count.

Similarly, the flip-flop SRF is reset by the delayed timing pulse TP1 (7) corresponding to the next timing pulse TP (7) through the OR gate RF to close the gates AF and AB to energize the coil C again to drive the carriage CA.

Similarly, the coil C is energized by the AND function of the delayed timing pulse TP2 and the logical OR output CCO of the count outputs of the counter CCH, to drive the carriage CA. For the timing pulses TP (7) and TP (8) of the signal waveform shown in FIG. 8, the energization of the coil C is not stopped, and when the timing pulse TP (9) arrives, the coil C is deenergized as is done for the timing pulses TP (5) and TP (6). In this manner, the speed of the carriage CA in bilateral directions is controlled with reference to the count n of the clock pulse CP by the counter CCH so that sequential printing is effected.

As described hereinabove, in the recording apparatus of the present invention, the slits SS are provided to extend over the path of the reciprocal movement of the carriage CA along the print paper P, and the speed and the position of the carriage CA are rapidly and exactly controlled over the path of the reciprocal movement of the carriage CA by the timing pulse TP for controlling the speed and indicating the print position and the signal TR for indicating the home position. Accordingly, stable print operation is attained with a relatively simple construction.

What is claimed is:

1. A recording apparatus comprising:

a carriage for scanning a print plane;

a record head having a plurality of ink jet nozzles mounted on said carriage;

the number of ink jet nozzles of a first color ink used to record primary characters or patterns being larger than the number of ink jet nozzles of a second color ink used to record non-primary characters or patterns; and the print speed for the primary characters or patterns being higher than the print speed for the non-primary characters or patterns.

2. A recording apparatus according to claim 1 wherein said ink jet nozzles of the first color ink for the primary characters or patterns are arranged in a direction of feed of a print paper.

3. A recording apparatus according to claim 1 further comprising respective tanks for the first and second color inks, wherein said tank for said first color ink is larger in capacity than said tank for said second color ink.

4. A recording apparatus according to claim 1 further comprising a linear motor, wherein said carriage is driven by said linear motor.

5. A recording apparatus according to claim 1 further comprising a pulse motor, wherein a print paper opposite to said ink jet nozzles is selectively driven in a paper feed direction and in a reverse direction from the paper feed direction by said pulse motor.

6. A recording apparatus comprising:

a carriage;

a motor for driving said carriage relative to the surface of a print paper in a carriage drive direction; and a plurality of ink jet nozzles mounted on said carriage, said plurality including a first number of ink jet nozzles for ink with a specific color and a second number of ink jet nozzles for another ink with a different color from said specific color, wherein said first number are arranged generally perpendicular to the carriage drive direction relative to each other and along the carriage drive direction relative to said second number and said first number is larger than said second number.

7. A recording apparatus according to claim 6 further comprising a pulse motor, wherein said print paper is selectively driven in a paper feed direction and in a reverse direction from the paper feed direction by said pulse motor.

8. A recording apparatus according to claim 6 wherein said motor comprises a linear motor.

9. A recording apparatus according to claim 6 further comprising respective tanks for ink of said specific color and said other color wherein said tank for said specific color ink is larger in capacity than said tank for said other color ink.

* * * * *

UNITED STATES PATENT AND TRADEMARK OFFICE

CERTIFICATE OF CORRECTION

PATENT NO. : 4,580,150

DATED : April 1, 1986

INVENTOR(S) : Shigemitsu Tazaki

It is certified that error appears in the above-identified patent and that said Letters Patent is hereby corrected as shown below:

Column 1, line 12, change "a" to --the--;

line 27, delete "of" (first occurrence);

line 50, delete --the--;

line 51, change "a" to --the--.

Column 2, line 59, take out paragraph break;

line 59, start a new paragraph with "When".

Column 3, line 57, change "twelveth" to --twelfth--;

line 67, after "state as" insert --the--.

UNITED STATES PATENT AND TRADEMARK OFFICE

CERTIFICATE OF CORRECTION

PATENT NO. : 4,580,150

DATED : April 1, 1986

INVENTOR(S) : Shigemitsu Tazaki

It is certified that error appears in the above-identified patent and that said Letters Patent is hereby corrected as shown below:

Column 4, line 55, change "the" to --an--;
line 56, change "an" to --the--.

Column 5, line 30, change "the" to --a--;
line 30, change "a" to --the--;
line 59, change "is" to --in--.

Column 15, line 43, after "stops" insert --counting and the flip-flop FCP is reset by the "0"--.

Column 16, line 32, delete "an".

Signed and Sealed this

Twenty-third Day of December, 1986

*Attest:*

DONALD J. QUIGG

*Attesting Officer* *Commissioner of Patents and Trademarks*